Figure 1:
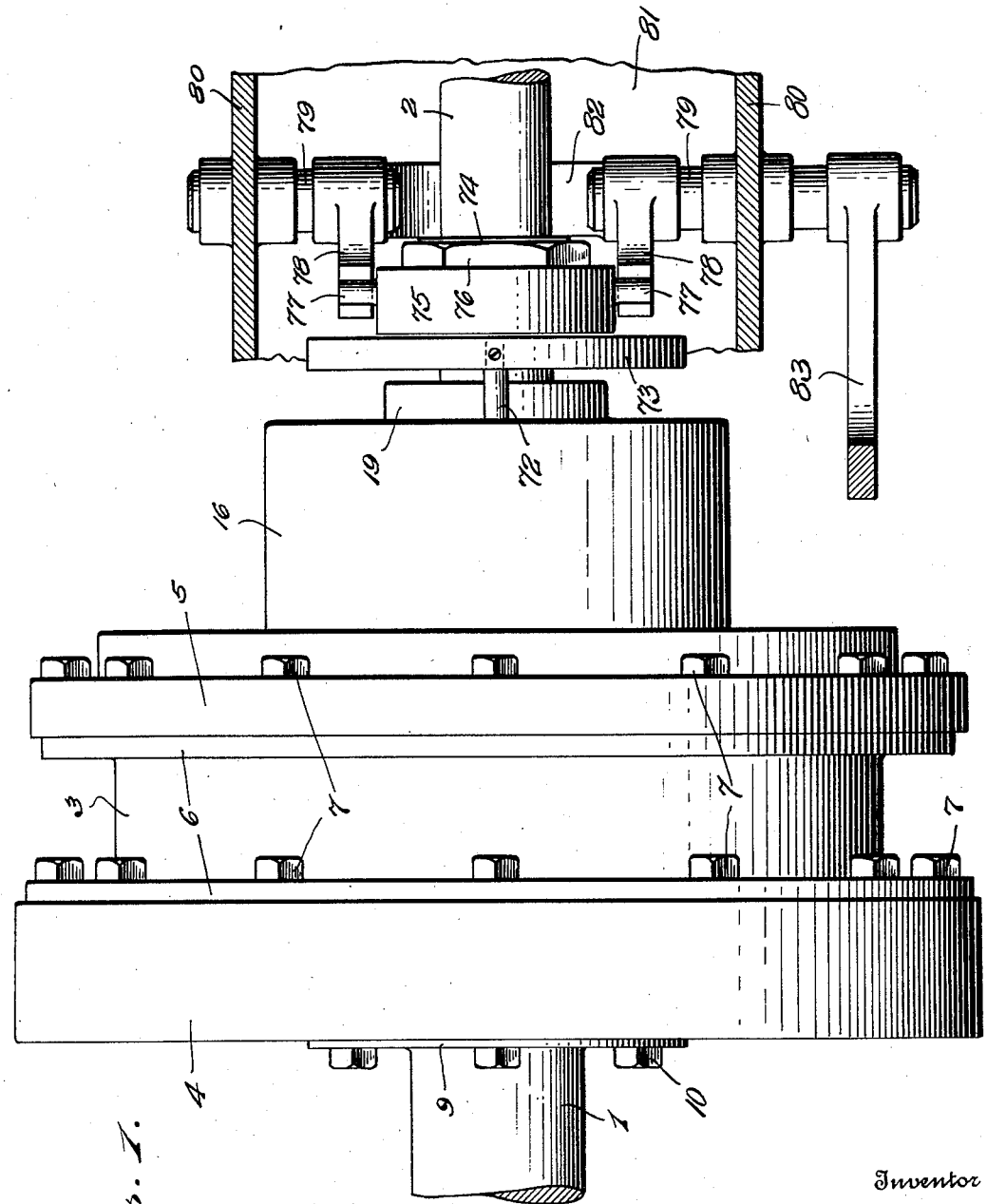

Dec. 20, 1938.  F. E. STAATS  2,140,886
HYDRAULIC CLUTCH
Filed Oct. 21, 1936  5 Sheets-Sheet 4

Inventor
F. E. Staats.
By Lacey & Lacey, Attorneys

Dec. 20, 1938.  F. E. STAATS  2,140,886
HYDRAULIC CLUTCH
Filed Oct. 21, 1936   5 Sheets-Sheet 5

Inventor
F. E. Staats.
By Lacey & Lacey,
Attorneys

Patented Dec. 20, 1938

2,140,886

UNITED STATES PATENT OFFICE 2,140,886

HYDRAULIC CLUTCH

Franklin E. Staats, Peoria, Ill., assignor to Staats Hydraulic Appliance, Inc., Peoria, Ill., a corporation of Illinois Application October 21, 1936, Serial No. 106,862

20 Claims. (Cl. 192—58)

This invention relates to hydraulic clutches and has for one of its objects the provision of means whereby rotary motion at controlled speeds may be transmitted to a driven member from a driving member very smoothly and changes in the speed of the driven member effected without shocks.

Another object of the invention is to so construct the improved clutch that the speed at which the driven shaft rotates may be varied from neutral to high speed and any speed desired obtained between the neutral and the high speed.

Another object of the invention is to provide the clutch with an improved casing and rotor within the casing, said rotor carrying sealing rings at its sides which serve as carriers for traction plungers of the rotor and also as means for tightly sealing compression chambers between the rotor and walls of the casing.

Another object of the invention is to so form and mount the sealing rings that they serve to isolate liquid in the rotor from liquid in the casing about the rotor, the liquid in the casing entirely filling the same and assisting in preventing leakage of liquid out of the compression chamber.

Another object of the invention is the provision of an improved rotary valve for controlling movement of liquid about the plungers of the rotor during operation of the clutch, the valve being so formed that pressure developed during operation of the clutch will not cause binding and prevent easy adjustment of the valve.

It is another object of the invention to provide in the valve a segregating bar which serves to divide the interior of the valve into compartments with which passages for conducting liquid about the plungers communicate and causes the liquid to move in a given direction during operation of the clutch.

Another object of the invention is to so construct the clutch that, when it is assembled, a single nut may serve to maintain the parts assembled and prevent them from shifting out of their proper positions relative to each other.

Another object of the invention is to provide improved means for turning the valve to adjusted positions, the said adjusting means operating through the casing and the rotor and being capable of actuation no matter whether the rotor and the driven shaft are stationary or rotating at controlled speed with or at variance with the speed of the drive shaft and the casing.

Another object of the invention is to so construct and mount the valve adjusting means that the actuating means thereof may have movement longitudinally of the driven shaft and this movement transformed into rotary movement for turning the valve from one position to another.

Another object of the invention is to so construct the clutch that it may serve not only as a clutch for transmitting rotation at controlled speed from a driving shaft to a driven shaft but also as a brake to check or entirely stop movement of a machine resulting from force outside the power unit as of a vehicle traveling down a hill.

Another object of the invention is to so mount the rotor and the valve-adjusting means that they will turn freely within the casing and substantially float in the oil with which the casing is filled, thus reducing friction to a minimum and preventing overheating of the oil and the moving parts.

Another object of the invention is to provide improved means for filling the casing and the compression chamber of the rotor with oil and then closing the filling opening and passages leading therefrom so that oil cannot escape and communication between the casing and the chamber will cut off so that oil in the compression chamber can not mingle with the body of oil in the casing.

Another object of the invention is the provision of a clutch which is of very strong and sturdy construction and so constructed that it will be easy to operate and not liable to get out of order.

The invention is illustrated in the accompanying drawings, wherein

Figure 2:
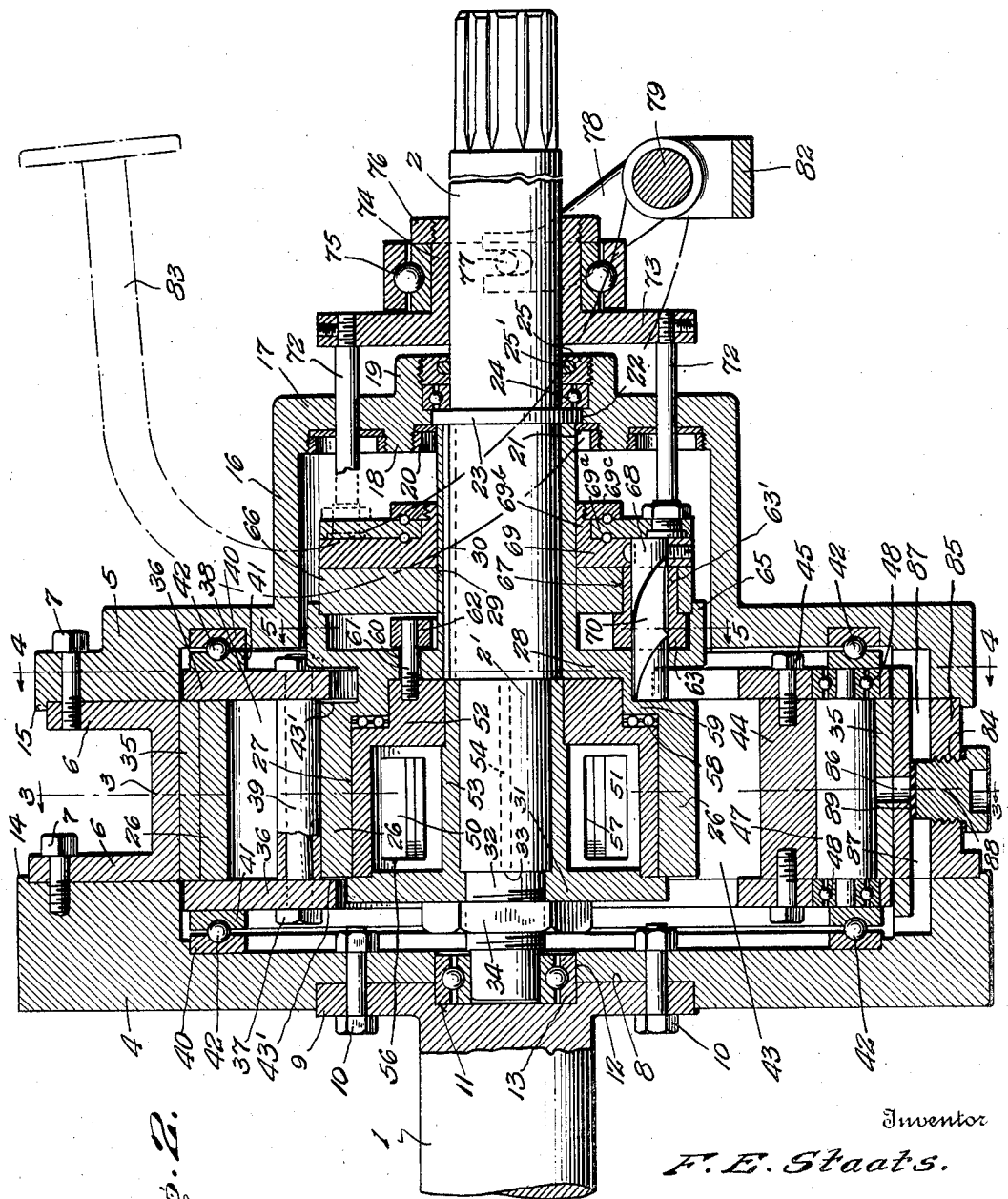
Figure 3:
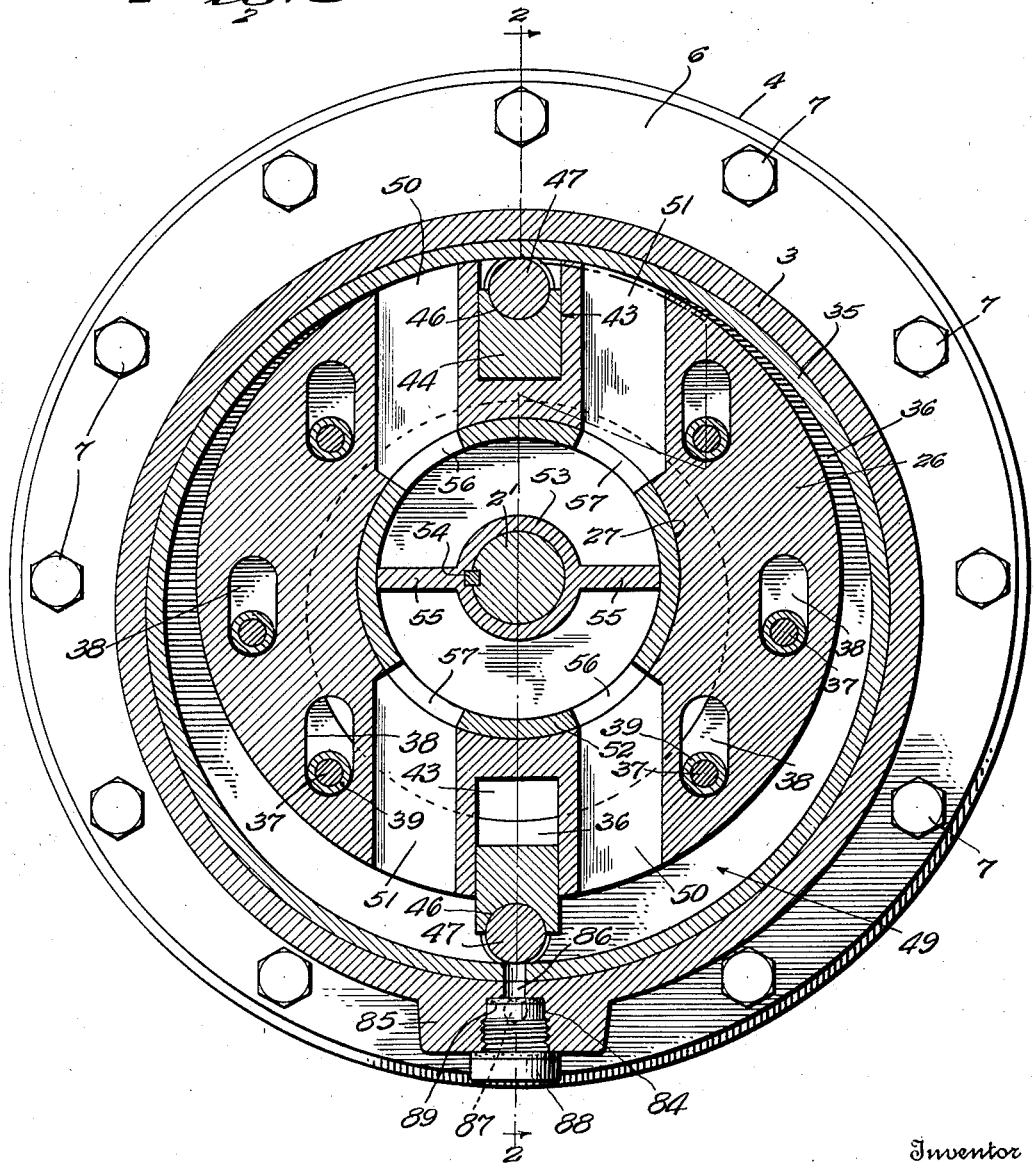
Figure 4:
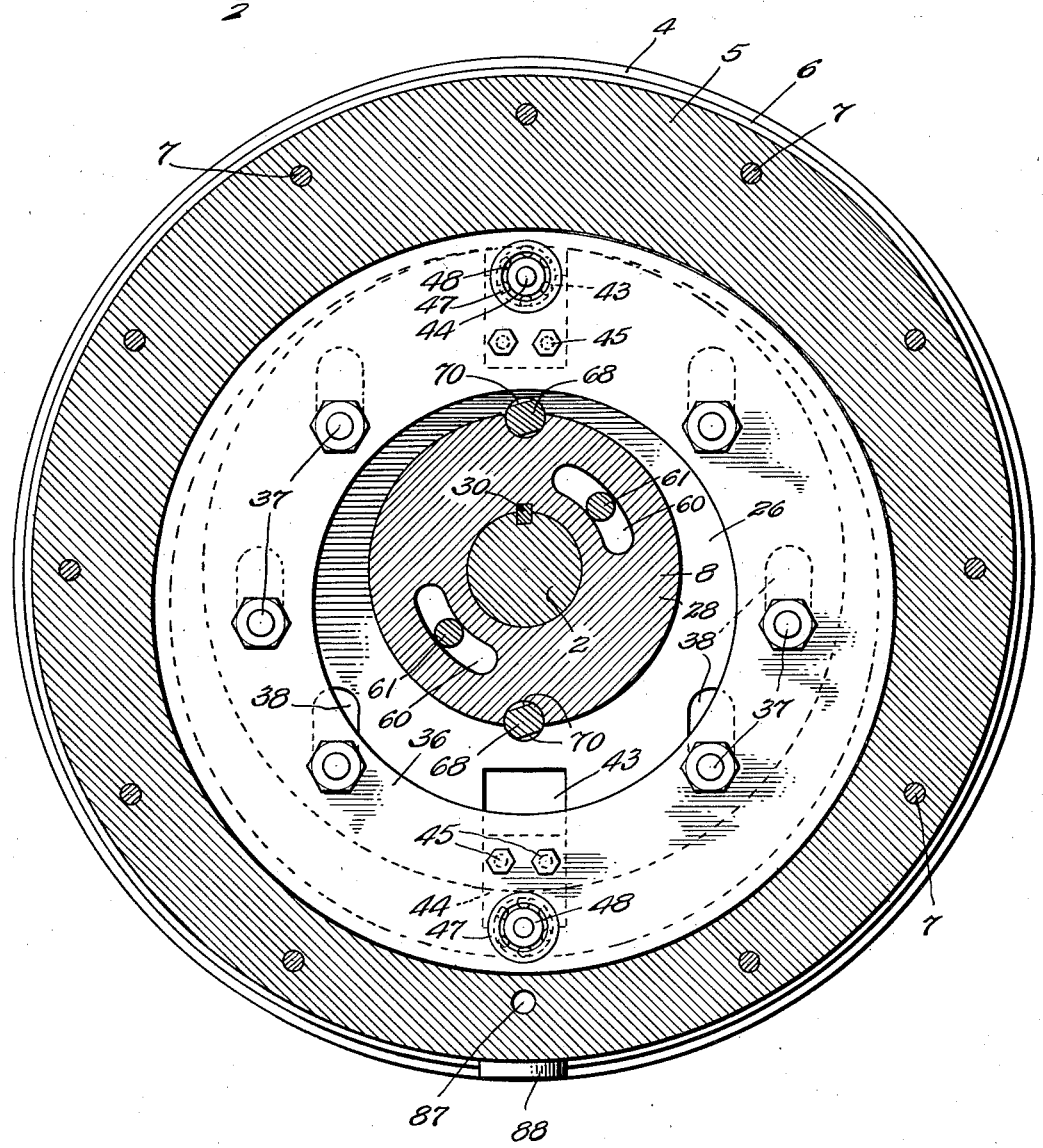
Figure 5:
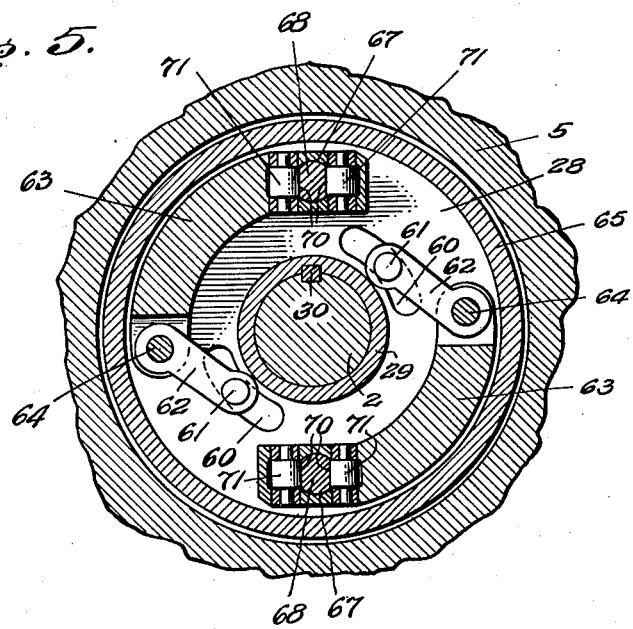
Figure 6:
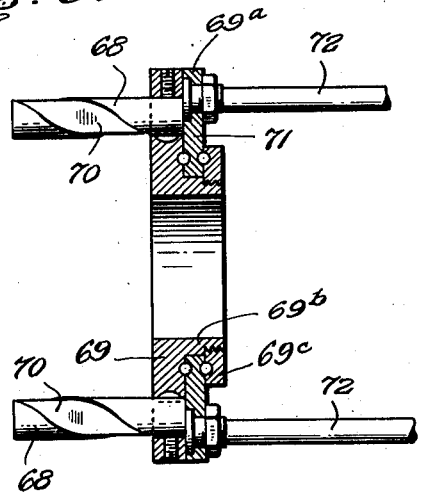

Figure 1 is a top plan view of the improved clutch,

Figure 2 is a sectional view taken longitudinally through the clutch upon the line 2—2 of Figure 3, Figure 3 is a sectional view taken transversely through the clutch along the line 3—3 of Figure 2, Figure 4 is a sectional view taken along the line 4—4 of Figure 2, Figure 5 is a fragmentary sectional view taken transversely through the clutch along the line 5—5 of Figure 2, and Figure 6 is a fragmentary sectional view of the means for adjusting the rotary valve forming part of the clutch.

This improved transmission serves to transmit rotary motion from a drive shaft 1 to a driven shaft 2 and has a casing consisting of a peripheral wall 3 and side or end walls 4 and 5, the peripheral wall being formed with side flanges 6 to which the side or end walls are secured by bolts 7. While the walls 4 and 5 are concentric to the alined shafts 1 and 2, as shown in Figure 2, the peripheral wall 3 is eccentric thereto, as shown in Figure 3. Upon referring to Figure 2, it will be seen that the side wall 4 is of greater thickness than the wall 5 and has its outer or front face formed with a concentric recess 8 into which the disc or collar 9 at the end of the drive shaft 1 is firmly secured by bolts 10. A pocket 11 formed in the end of the drive shaft 1 registers with an opening 12 formed centrally of the wall 4 and cooperates therewith to provide a recess or seat of sufficient depth to receive a bearing 13 into which fits the forward end of the driven shaft 2. The connection between the wall 4 and the drive shaft is similar to the manner in which a flywheel is secured to the crank shaft of an engine and when the casing is so secured to this shaft, it takes the place of a flywheel. The inner side faces of the walls 4 and 5 are formed with marginal flanges 14 and 15 which fit snugly about marginal edges of the flanges 6 of the peripheral wall 3 so that, when these walls are assembled and the shaft 1 and the casing rotating, centrifugal force cannot shift the walls 3, 4 and 5 out of proper relation to each other and cause the bolts 7 to be sheared. The central portion of the wall 5 is open and about this central opening is a cup-shaped extension 16 which is concentric to the shaft 2 and defines a chamber leading from the interior of the casing and having a head 17 at its outer end. Annular flanges 18 and 19 surround an opening formed centrally of the head 17. The inner flange 18 carries a threaded securing ring 20, by means of which a flexible sealing ring 21 is held firmly in place against an internal flange 22 which surrounds the flanges or collar 23 formed about the shaft 2. This sealing ring serves to tightly seal space between the flanges 22 and 23 to prevent escape of oil from the casing and attention is called to the fact that the greater the pressure is the tighter the seal will be. The outer side face of the collar 23 bears against a thrust bearing 24 which is held in place by a packing ring 25 screwed into the flange 19. It will thus be seen that the shaft 2 will be rotatably mounted and braced against longitudinal shifting and that if any oil should seep past the seal 21 when the clutch is idle it will be stopped by the packing 25' of the ring 25.

A rotor 26 which is of circular outline, as shown in Figure 3, is housed within the chamber of the casing and formed with a central pocket 27. The portion 28 of the rotor which forms a head for the pocket 27 fits snugly about the shaft 2 and is formed with a hub or sleeve 29 which fits snugly about the shaft 2 with one end abutting the collar 23 and surrounded by the sealing ring 21, the hub being keyed to the shaft, as shown at 30, so that the rotor and the driven shaft turn together. The rotor is concentric to the driven shaft. The other end of the pocket is closed by a cap or disc 31 which fits about the reduced and threaded portion 32 of the shaft 2 and is held firmly against the rotor and the shoulder 33 of the shaft by a nut 34 which holds all of the elements carried by the shaft 2 in place and prevents them from shifting longitudinally of the shaft. A cam ring 35, the inner peripheral face of which is a generated curve elongated horizontally on Figure 3, is mounted in the chamber of the casing against the inner surface of the peripheral wall 3, and this ring fits between sealing rings 36 which bear against opposite sides of the rotor and are held in place by bolts 37 extending through slots 38 formed in the rotor and carrying spacing sleeves 39, the ends of which bear against the sealing rings. The rings 36 will thus turn with the rotor and, in order to reduce friction, there have been provided bearing rings 40 and 41 disposed in space between the sealing rings 36 and side walls 4 and 5 of the casing with bearing balls 42 between the bearing rings. In view of the fact that the driven shaft 2 is rotatably mounted in bearings 13 and 24 and the rotor is mounted between the thrust bearings just referred to, the shaft and the rotor will turn very freely in the casing and in fact will be substantially floating in oil with which the casing is filled. Pockets 43 are formed in diametrically opposed portions of the rotor and in these pockets fit plungers 44 which are firmly secured to the discs 36 by bolts or screws 45 and are recessed along their outer ends, as shown at 46, to receive rollers 47 journaled in bearings 48 carried by the sealing discs. It will thus be seen that during rotation of the rotor and the shaft 2, relative movement may take place between the rotor and the sealing discs and the plungers will slide in the pockets 43 radially of the rotor. The rotor is concentric to the shaft 2 but in eccentric relation to the sealing discs and the cam ring 35, as shown in Figure 3. Therefore, a crescent-shaped space is provided in the casing constituting a compression chamber 49 through which the plungers and their rollers move during rotation of the rotor. The sealing rings tightly seal the compression chamber at opposite sides thereof so oil cannot escape into the casing and it should also be noted that since the casing is also completely filled with oil which is a non-compressible fluid, the body of oil in the casing serves as a confining agent to retain the oil in the compression chamber and prevent it from escaping when the rotor is in motion. The fact that the pockets 43 extend longitudinally entirely through the rotor leaves their inner end portions open at their sides when the plungers are extended. Therefore, as a plunger moves inwardly to a retracted position, oil in the pocket in which it is mounted can pass out through sides of the pocket and an equal quantity of oil enter the other pocket as the plunger therein moves outwardly. There have also been provided slight spaces 43' between the sealing rings and inner ends of the pockets 43 for escape of oil. It will thus be seen that trapping of oil in inner ends of the pockets will be entirely eliminated and formation of oil cushions which would prevent easy sliding of the plungers will not occur.

Passages 50 and 51 extend through the rotor at opposite sides of the pockets 43 from the peripheral edge face of the rotor to the pocket 27 and in this pocket fits a rotary valve 52 which is cup-shaped, as shown in Figure 2, and has its open end closed by the disc 31. A central sleeve 53 which fits snugly about the reduced portion 2' of the shaft 2 is formed integral with the disk 31 and keyed to the shaft, as shown at 54. Webs 55 which form a segregating plate extend radially from the sleeve in diametrically opposed relation to each other from the sleeve to the annular wall of the valve against which they have close contacting engagement. By this arrangement, the interior of the valve will be partitioned to form separate chambers, the peripheral walls of which are formed with ports 56 and 57 to register with the passages 50 and 51 of the rotor. By turning the valve, the extent to which the ports register with the passages may be regulated and the freedom with which oil passes through the chambers defined by the segregating bar controlled. The segregating bar defines the course of fluid pressure within the rotor and the pressure chamber in such a manner that it will always be exerted against the pressure side of each plunger and plunger roller consecutively, and may never accumulate on the non-pressure side of any plunger to neutralize pressure exerted on the pressure side of such plunger by rotation of the casing and the cam sleeve 35. By attaching the segregating bar and the sleeve or hub carrying the same to the shaft 2 instead of to the sleeve valve, the force set up by movement of fluid through the valve is exerted against the segregating bar and the shaft 2 instead of against a movable port of the valve itself, thereby completely avoiding pressure against movable valve parts which would interfere with or obstruct free movement of the valve during adjustment thereof. A bearing 58 which is mounted between the head of the rotary valve and the internal shoulder 59 of the rotor permits the valve to be easily turned to adjust the extent to which its ports register with the passages of the rotor. The fact that the valve is filled with oil balances the valve and prevents it from turning too freely or having a tendency to stick when turned.

In order to permit the valve to be turned, the head 28 of the valve chamber has been formed with circumferentially extending slots 60 through which extend pins 61 carried by the valve. Links 62 are pivotally mounted upon the pins 61 and have their other ends pivotally connected with arms 63 by pins 64. The links and the arms are housed in a chamber formed by an annular flange 65 of the rotor and a block 66 fitting snugly about the hub 29 of the rotor with its outer peripheral edge portion bearing against the flange. This block not only forms a closure for the chamber in which the links and the arms are mounted, but also serves as a mounting for the hubs 63' of the arms 63. These hubs are rotatably received in openings formed through the block and are bored axially, as shown at 67, to receive the stems 68 carried by a disc 69 which also fits about the hub of the rotor. Referring to Figure 5, it will be seen that the bores 67 have opposed flat sides which are open to expose the spirally extending flat faces 70 of the stems 68 and permit these spirally extending faces to engage the roller bearings 71 carried by the arms. The disc or collar 69 turns with the rotor but carries a loosely mounted ring 69a which is held upon the hub 69b of the collar by a nut 69c and is rotatable relative to the collar. The ring 69a carries arms or rods 72 which extend through openings formed in the head 17 of the extension 16 of the casing. Therefore, the ring may turn with the casing and the drive shaft at the speed of the casing while the collar 69 turns with the rotor at a different rate of speed, and by shifting the ring longitudinally of the shaft 2, the collar and the stems 68 will be shifted with it and the flat faces 70 of the stems impart swinging movement to the arms 63 about the stems. Swinging movement of these arms exerts pull or push upon the links 62 and causes turning movement to be transmitted to the rotary valve and the ports 56 and 57 of the valve will be shifted relative to the passages 50 and 51 to regulate the freedom with which oil may pass through the passages and the ports from the pressure side of a plunger 46 and its roller 47 to the other.

The freedom with which oil passes from one side of a plunger to the other side thereof controls rotation of the rotor and the driven shaft, and from an inspection of Figure 3, it will be readily seen that as the casing rotates, eccentric motion of the casing about the rotor will cause oil in the pressure chamber to be urged towards a plunger to act upon the plunger and carry the rotor and the driven shaft around with it. If the valve is in position to block the passages, the full force of the oil acts against the plungers to turn the rotor and the driven shaft at the same speed as the drive shaft but when the valve is turned to move its openings into partial or complete registry with the passages 50 and 51 of the rotor a portion of the oil or all of the oil will be permitted to pass through the valve and about the plungers instead of acting at full force against the plungers. Therefore, the rotor and the driven shaft may be caused to rotate slower than the drive shaft or the drive shaft and the casing may rotate without imparting any rotary motion to the rotor and the driven shaft if the openings of the valve are in complete registry with the passages of the rotor.

At their outer ends, the rods 72 are secured in diametrically opposed portions of a disc or collar 73 having a sleeve or hub 74 which fits snugly about the shaft 2. A bearing 75 fits about the sleeve 74 where it is held by the nut 76 and this bearing has its outer race formed with diametrically opposed lugs 77 engaged by forks 78 carried by shafts 79 which are journaled through side walls 80 of a mounting 81, as shown in Figure 1. The forks 78 are connected by a yoke 82 so that the forks and the shafts 79 turn as a unit and the forks cause the collar 73 to be slid along the shaft 2 when rotary motion is imparted to one of the shafts 79 by applying pressure to the foot pedal 83 carried by one of the shafts 79. By this arrangement the rods 72 may have movement imparted to them longitudinally of the driven shaft through a rotating casing through which they pass and with which they turn, and during this movement of the rods through the rotating casing, rotary motion will be transmitted to the valve carried by the rotor to cause the rotor and the driven shaft 2 to rotate at a selected speed relative to the speed of the drive shaft or remain stationary.

When this improved clutch is in use, the casing has its side wall 4 bolted to the drive shaft 1 which may be the crank shaft of an engine. The driven shaft 2 is disposed in axial alinement with the driving shaft 1 and may be of any length desired. When the motor is started, the shaft 1 rotates continuously and the casing of the clutch turns with it. As the annular wall 3 of the casing and the cam ring are eccentric to the rotor and the driven shaft, they swing in an eccentric path about the rotor and as the sealing rings 36 move transversely of the casing and carry the plungers 44, these plungers will have reciprocating movement imparted to them from the retracted position shown at the top of Figure 3 to the extended position shown at the bottom of this figure. At this point it is desired to call attention to the fact that, while the rings 36 move circumferentially with the rotor 26, a secondary movement takes place. At the same time the sealing rings 36 are rotating, they also have a transverse or longitudinal movement through their axis of rotation. This transverse movement is caused by the changing position of the cam ring 35 with respect to the axis of rotation of the rotor 26.

When the device is in the position shown in Figure 3, the sealing rings 36 are off center with respect to the rotor, downward the width of the cam chamber 49. If the outer casing, however, is rotated 180 degrees, the rotor remaining stationary, the sealing rings 36 are then off center in an upward direction with respect to the axis of the rotor by the width of the cam chamber 49. While the casing has moved 180 degrees the sealing rings have moved transversely of the axis of rotation, the width of the cam chamber 49.

The means of propulsion is not the bolts 37 which are loose in their slots but the plungers 44 which are slidably fitted in the plunger sockets 43. The purpose of the bolts 37 is solely to space the sealing rings 36 on either side of the rotor 26 and maintain uniform and constant space between the sealing rings themselves. In other words, the bolts 37 serve to fasten the rings together and hold them in place with reference to the rotor, also acting as spacer bars to maintain the correct distance between the two rings. The sole means of propulsion of the rings circumferentially is the plungers 43. Oil is urged about the rotor through the compression chamber and when the valve is in the neutral position shown in Figure 3, the casing turns freely about the rotor and the shaft 2 without rotating the shaft as oil with which the compression chamber is filled may flow freely through a passage 50 and through the cooperating chamber of the valve and back through the companion passage 51 to the other side of a plunger. By adjusting the valve in a closing direction, the moving body of oil is caused to act upon the plungers and impart rotation to the rotor and the driven shaft at either a reduced speed or at the same speed as the drive shaft according to how completely the passages 50 and 51 of the rotor are blocked.

Oil is poured into the casing through an inlet port 84 formed through a boss 85 provided by thickening the peripheral wall 3 of the casing at one point about the circumference thereof. A reduced inner end portion 86 of the filling opening communicates with the space between the peripheral edge face of the rotor and the cam ring 35 so that the compression chamber 49, the passages 50 and 51 and the chambers of the rotary valve may be entirely filled with oil. Side passages 87 lead from the filling opening 84 through the peripheral wall of the casing and into the side walls 4 and 5 of the casing, as shown in Figure 2, so that oil will fill the entire interior of the casing about the rotor and the elements in the extension 16, and attention is called to the fact that, when the plug 88 is screwed into place to close the filling opening, its inner end which carries a gasket 89 will tightly seal the reduced inner end portion 86 of the filling opening, while opposed side portions of the plug will tightly close the side extensions 87. Therefore, bodies of oil in the casing and in the interior of the rotor will be entirely segregated from each other and prevented from intermingling. As previously explained, the oil entirely fills the casing and as it is non-compressible it prevents any danger of oil escaping from the compression chamber when pressure is applied thereto during operation of the clutch. The rotor should be turned during filling so that all air will be caused to pass out through the filling opening and the casing and the interior of the rotor entirely filled with oil.

When it is desired to impart rotation to the driven shaft 2, it is merely necessary to apply pressure to the foot pedal 83 and force the same downwardly to rotate the shafts 79 and slide the collar or disc 73 along the shaft 2 towards the casing. In so doing, the stems 68 will be shifted longitudinally and their flat spirally extending faces will impart swinging movement to the arms 5 63. Since these arms are connected with the pins 61 by the links 62, the valve will be rotated to gradually move the ports 56 and 57 out of registry with the passages 50 and 51. As the ports move out of registry with the passages, the freedom with which oil may flow through these passages from one side of a plunger to the other will be reduced until complete closing of the passages by movement of the ports 56 and 57 out of registry therewith entirely prevents flow of oil through the passages and about the plungers. Interference with the flow of oil through these passages causes the oil to gradually apply increasing pressure upon the plungers and cause the rotor to turn with the casing. As the ports first begin to move out of registry with the passages, the movement imparted to the rotor and the shaft 2 will be a great deal slower than that of the drive shaft 1 and the casing but the speed will gradually increase until the ports are completely out of registry with the passages, at which time the driven shaft 2 will rotate at the same rate of speed as the drive shaft. It will thus be seen that any speed desired may be imparted to the driven shaft by shifting the ports from the position in which they fully register with the passages and the driven shaft remains stationary to a position in which the ports are entirely out of registry with the passages for causing full speed of the driven shaft. As there are no clutch gears which must be moved into mesh with each other and there are no transmission gears which must be selectively engaged with each other to obtain predetermined speeds, any speed desired may be obtained and also changes from the lowest to the highest speed may be gradually effected and without shocks or grinding noises. This improved clutch also provides means for securing the maximum capacity of a power unit at slow speed of the driven member.

It is a well known fact that either a gas engine or a Diesel engine produces its maximum power at a given number of revolutions per minute, which are higher than can be absorbed by the driven member at slow speeds when directly connected thereto. Therefore, it is customary to step down the R. P. M. of the power unit by means of gears so that the power unit may travel at sufficient R. P. M. to provide the power to start the driven member without undue jerk of the driven member. When, however, a clutch, as above described, is used, the speed of the power unit may remain constant, the speed of the driven member depending entirely upon the position of the rotary valve 52. Therefore, it is always possible to secure the R. P. M. giving the maximum power in the power unit for use in turning the driven member without the intervention of gears. The improved clutch does not multiply the power of the power unit, but it does permit use of the maximum power of the power unit at any and every speed of the driven member.

The improved clutch not only serves as a clutch for transmitting rotation to the driven shaft at a selected speed but will also serve as a brake for quickly bringing an automobile to a stop or for checking its speed when going down hill. When it is used as a brake, the operation is as follows:

Let it be assumed that a truck or other vehicle is at the top of a long descending grade. It will be observed that the rotor 26 revolves independently of the casing unless the sleeve valve 52 is closed. In normal operation the rotor will revolve in the direction of the casing since the vehicle is moving forwardly. In order to check the speed of a vehicle, the operator opens the valve and then throws the conventional reverse gear into a reversing position while the vehicle is still moving forwardly. This results in the rotor 26 revolving in a direction opposite to that of the casing. As in the case of normal operation, the valve 52 controls the release of fluid from the pressure segment of the pressure chamber 49. Therefore, by partially closing the valve, the casing exerts an increasing pressure against the pressure side of the plungers 44 and their rollers 47, resulting in a force opposite to the direction in which the rotor 26 revolves. Since the rotor and the casing revolve independently when the valve is open, the speed of rotation of the casing may be increased to the speed of the maximum efficiency of the power unit and as the rotary valve is partially closed the full power of the power unit is brought against the rotor in opposition to its direction of rotation when propelled by the weight of the driven unit or truck with the gear in reverse. The power unit, therefore, may be used to its maximum capacity as a brake against the movement of the truck down hill. In fact, the truck may be brought to a full stop and caused to back up the hill if so desired.

Having thus described the invention, what is claimed as new is:

1. In a hydraulic clutch, a rotary casing adapted to be driven by a power unit, a driven shaft extending into said casing through a side thereof and rotatably mounted, a rotor fixed to said driven shaft eccentric to the peripheral wall of said casing to provide a compression chamber between the rotor and the peripheral wall of the casing for a portion of the circumference thereof, plungers slidable radially of the rotor and moving through the compression chamber as the casing turns about the rotor, said rotor being provided with means for conducting liquid solely through a predetermined channel from one side of each of the plungers to another side thereof and permit rotation of said casing relative to the rotor, and means for gradually reducing flow of liquid about the plungers and causing the liquid to apply pressure to the plungers to cause rotation of the rotor and the driven shaft with the casing at controlled speed.

2. In a hydraulic clutch, a rotary casing adapted to be connected with a power unit, a driven shaft extending into said casing and rotatably mounted, a rotor fixed to said driven shaft eccentric to the peripheral wall of said casing to provide a compression chamber between the rotor and the peripheral wall of the casing, plungers carried by said rotor and moving through said compression chamber during rotation of the casing about the rotor, means for conducting liquid through the rotor solely through a predetermined channel from one side of a plunger to the other side thereof during rotation of the casing about the rotor, and means carried by said rotor for retarding flow of liquid through the rotor and causing the liquid to act upon the plungers to effect rotation of the rotor and driven shaft with the casing at controlled speed.

3. In a hydraulic clutch, a rotary casing adapted to be secured at one side to a drive shaft concentric thereto, a driven shaft extending into said casing through the other side thereof and rotatably mounted in alinement with the drive shaft, a rotor fixed to said driven shaft concentric thereto, the peripheral wall of said casing being eccentric to the rotor to provide a circumferentially extending pressure chamber between the rotor and the peripheral wall of the casing, plungers slidable radially of the rotor and moving through said chamber during rotation of the casing about the rotor, said rotor having means for conducting liquid through a predetermined channel from one side of each plunger to the other side thereof during rotation of the casing about the rotor, and a rotary valve mounted in said rotor and adjustable therein to gradually reduce flow of liquid about the plungers whereby the liquid will act upon the plungers and effect rotation of the rotor and the driven shaft with the casing at controlled speeds.

4. In a hydraulic clutch, a casing adapted to be secured at one side to a drive shaft concentric thereto, a driven shaft extending into said casing through the other side thereof concentric thereto and rotatably mounted, a rotor in said casing fixed to said driven shaft, the portion of the peripheral wall of said casing surrounding the rotor being eccentric to the rotor to provide a circumferentially extending pressure chamber between the rotor and the peripheral wall of the casing, plungers slidable radially of the rotor and moving through said compression chamber during rotation of the casing about the rotor, said rotor having passages for conducting liquid about the plungers during rotation of the casing relative to the rotor, a rotary valve mounted in said rotor and adjustable therein to retard flow of liquid through the passages about the plunger to cause the liquid to act against the plungers to effect rotation of the rotor and the driven shaft with the casing at controlled speeds, adjusting means for said valve carried by said rotor, and actuating means for said adjusting means carried by said casing and moving with the same.

5. In a hydraulic clutch, a casing adapted to be secured to a drive shaft, a driven shaft extending through said casing and rotatably mounted therein, a compression chamber being formed in said casing about the rotor eccentric thereto, plungers slidably carried by said rotor for operating in the compression chamber during rotation of the casing, the rotor being formed with passages for conveying liquid exclusively between portions of the chamber at opposite sides of a plunger, a rotary valve carried by said rotor, and means for adjusting said valve to control flow of liquid through said passages about the plungers and cause turning of the rotor and the driven shaft with the casing at controlled speed.

6. In a hydraulic clutch, a casing adapted to be secured to a concentric drive shaft, a driven shaft extending through said casing concentric thereto and rotatable therein, a rotor fixed to said driven shaft concentric thereto within the casing, a compression chamber eccentric to the rotor being provided in the casing about the rotor, the rotor being formed with radially extending pockets and with passages at opposite sides of the pockets leading from the peripheral face of the rotor to a central chamber therein, means for filling the casing and the rotor with liquid, sealing discs in the casing at opposite sides of said rotor for isolating liquid filling the rotor and the compression chamber from liquid filling the casing, plungers carried by said discs and slidably seated in said pockets with their outer ends bearing against the peripheral wall of the casing about the rotor and adapted to operate in the compression chamber during rotation of the casing, a rotary valve in the center chamber of said rotor for controlling flow of liquid through the passages and center chamber from the compression side of a plunger to the other, and means for adjusting said valve to gradually close the passages and effect controlled rotation of the rotor and the driven shaft with the casing.

7. In a hydraulic clutch, a casing adapted to be secured at one side to a drive shaft concentric thereto, a driven shaft extending into said casing through the other side thereof and rotatably mounted, a rotor fixed to said driven shaft within the casing, a circumferentially extending pressure chamber being provided between the rotor and the peripheral wall of said casing eccentric to the rotor, plungers slidable radially of said rotor and moving through said compression chamber during rotation of the casing about the rotor, said rotor having a central chamber and passages leading therefrom at opposite sides of the plungers for conducting liquid about the plungers as the plungers move through the said compression chamber during rotation of the casing about the rotor, a rotary valve in the central chamber for controlling flow of liquid through the passages and about the pistons, pins extending from said valve through a side of the rotor, levers pivotally mounted, links connecting said levers with said pins, and actuating means for said levers shiftable longitudinally of the driven shaft and connected with the levers for swinging the levers and effecting rotation of the valve.

8. In a hydraulic clutch, a casing adapted to be secured at one side to a drive shaft concentric thereto, a driven shaft extending into said casing through the other side thereof concentric thereto and rotatably mounted, a rotor fixed to said driven shaft, a compression chamber eccentric to the rotor being provided in the casing and extending circumferentially of the casing between the rotor and the peripheral wall of said casing, plungers slidable radially of said rotor and moving through said compression chamber during rotation of the casing about the rotor, said rotor having a central chamber and passages leading therefrom at opposite sides of the plungers for conducting liquid about the plungers as the plungers move through the compression chamber during rotation of the casing about the rotor, a rotary valve in the central chamber for controlling flow of liquid through the passages and about the plungers, pins extending from said valve through a side of the rotor, links carried by said pins, a mounting carried by said rotor, levers pivoted to said links and having hubs journaled through said mounting and having bores, a carrier shiftable longitudinally of the driven shaft, and arms extending from said carrier through said bores and having spirally extending flat faces for engaging portions of the levers to swing the levers and turn the valve to gradually close the passages and cause rotation of the rotor and the driven shaft with the casing at controlled speed.

9. In a hydraulic clutch, a casing adapted to be secured at one side to a drive shaft concentric thereto, a driven shaft extending into said casing through the other side thereof and rotatably mounted, a rotor fixed to said driven shaft, the portion of the peripheral wall about the rotor being eccentric thereto to provide a circumferentially extending pressure chamber between the rotor and the peripheral wall of said casing, sealing rings at opposite sides of said rotor, bolts connecting said sealing rings and extending through slots formed in the rotor to permit relative movement of the rotor and the rings, said rotor having radially extending pockets formed therein and passages at opposite sides of the pockets leading to a central chamber of the rotor for communicating with the compression chamber, the casing and the rotor being filled with liquid, plungers carried by said rings and slidably received in said pockets, rollers at outer ends of the plungers bearing against the peripheral wall of the casing, the plungers having movement through the pressure chamber as the casing turns about the rotor and the liquid being adapted to flow through the passages about the plungers, a valve in the central chamber of said rotor, and means to adjust said valve to gradually close the passages and shut off flow of liquid about the plungers to cause rotation of the rotor and the driven shaft with the casing at controlled speed.

10. In a hydraulic clutch, a casing adapted to be secured at one side to a drive shaft and having its other side formed with a reduced extension having a head at its outer end, a driven shaft extending through said head into said casing and rotatably mounted, a rotor fixed to said driven shaft within the casing and having a sleeve extending into the extension of the casing, the portion of the annular wall of the casing about the rotor being eccentric to said rotor to provide a pressure chamber between the rotor and casing, plungers slidable radially of said rotor for moving through the pressure chamber as the casing turns about the rotor, said rotor having passages for conducting liquid about the plungers, a rotary valve in said rotor, a mounting carried by said sleeve, adjusting means for said valve including levers having hubs journaled through the mounting to pivotally mount the levers, a disc slidable along said sleeve, arms carried by said disc and slidably engaged through the hubs, the arms having cam surfaces for turning the hubs to swing the levers and rotate the valve when the disc is shifted along said sleeve, a collar loose about said disc, rods extending from said collar through said head, and means connected with outer ends of said rods for shifting the same longitudinally.

11. In a hydraulic clutch, a casing adapted to be connected with a drive shaft, a driven shaft extending into said casing, a rotor carried by said driven shaft and having a sleeve, plungers carried by said rotor, the rotor having passages for conducting liquid about the plungers during rotation of the casing about the rotor, a rotary valve for controlling flow of liquid through said passages, and adjusting means for said valve including a disc slidable longitudinally of the driven shaft along said sleeve, a ring rotatably carried by said disc, rods extending from said ring longitudinally of the driven shaft and out of said casing, a collar loose about the driven shaft and connected to outer ends of the rods, a bearing carried by said collar, lugs extending from said bearing, a rock shaft, forks carried by said rock shaft and engaging said lugs, and means to rotate the rock shaft and swing the forks to slide the collar along the driven shaft to adjust the valve.

12. In a hydraulic clutch, a rotary casing, a rotor in said casing, an eccentric compression chamber being provided in said casing about the rotor, plungers carried by said rotor and moving through the compression chamber during rotation of the casing about the rotor, the rotor having passages for conveying fluid exclusively from one side of a plunger to the other side thereof, a rotatable sleeve valve in said rotor for controlling flow of fluid through the passages from one side of a plunger to the other side thereof, and means for adjusting said valve to retard flow of fluid about the plungers whereby the fluid will act against the plungers and cause the rotor to rotate with the casing at controlled speeds.

13. In a hydraulic clutch, a rotary casing, a rotor in said casing, an eccentric compression chamber being provided in said casing about the rotor, plungers carried by said rotor and moving through the compression chamber during rotation of the casing about the rotor, the rotor having passages for conducting fluid about said plungers, a rotatable sleeve valve in said rotor for controlling flow of fluid through said passages and about the plungers, means for shifting said valve into and out of position to retard flow of fluid about the valve and cause the fluid to act against the plungers to rotate the rotor with the casing, and means in the valve for segregating fluid acting against one plunger from the remaining fluid in the rotor and causing the fluid to move in one direction.

14. In a hydraulic clutch, a rotary casing, a rotor in said casing, an eccentric compression chamber being provided in said casing about the rotor, plungers carried by said rotor and moving through the compression chamber during rotation of the casing about the rotor, the rotor having passages for conducting fluid about said plungers, a rotatable sleeve valve in said rotor for controlling flow of fluid through said passages and about the plungers, means for shifting said valve into and out of position to retard flow of fluid about the valve and cause the fluid to act against the plungers to rotate the rotor with the casing, and a segregating bar in said valve for separating fluid operating through one set of passages from fluid operating through another set of passages.

15. In a hydraulic clutch, a rotary casing, a rotor in said casing, an eccentric compression chamber being provided in said casing about the rotor, plungers carried by said rotor and moving through the compression chamber during rotation of the casing about the rotor, the rotor having passages for conducting fluid about said plungers, a rotatable sleeve valve in said rotor for controlling flow of fluid through said passages and about the plungers, means for shifting said valve into and out of position to retard flow of fluid about the valve and cause the fluid to act against the plungers to rotate the rotor with the casing, and means in the valve for directing fluid through the valve and segregating fluid acting against one plunger from fluid acting against another plunger.

16. In a hydraulic clutch, a rotary casing, a rotor in said casing, an eccentric compression chamber being provided in said casing about the rotor, plungers carried by said rotor and moving through the compression chamber during rotation of the casing about the rotor, the rotor having passages for conducting fluid about said plungers, a rotatable sleeve valve in said rotor for controlling flow of fluid through the passages from one side of a plunger to the other side thereof, a rotary driven shaft extending into said casing and secured to said rotor, means carried by said shaft in said valve for directing fluid through the valve and segregating fluid acting against one plunger from fluid acting against another plunger, and means for adjusting said valve.

17. In a hydraulic clutch, a rotary casing adapted to be driven by a power unit, a driven shaft extending into said casing, a rotor in said casing fixed to said shaft, a compression chamber being provided in the casing about said rotor, plungers slidably carried by said rotor for operating in said compression chamber, means being provided for completely filling the casing and the compression chamber with fluid, and means for isolating fluid in the compression chamber from fluid in the remainder of the casing.

18. In a hydraulic clutch, a rotary casing adapted to be driven by a power unit, a driven shaft extending into said casing, a rotor in said casing fixed to said shaft, a compression chamber being provided in the casing about said rotor, sealing rings in said casing at opposite sides of said rotor, plungers carried by said rings between the same and seated in pockets formed in the rotor, the plungers being movable with the rings radially of the rotor into and out of said compression chamber as the casing turns about the rotor, the rotor being provided with means for conducting liquid through the rotor about said plungers, said rings serving to isolate liquid in the compression chamber and the rotor from liquid filling the remainder of the casing, and means for shutting off flow of liquid about the plungers and causing rotation of the rotor and the driven shaft with said casing.

19. In a hydraulic clutch, a rotary casing adapted to be driven by a power unit, a driven shaft extending into said casing and rotatably mounted, a rotor carried by said driven shaft in said casing, a compression chamber being formed in the casing about said rotor, plungers carried by said rotor and operating in the compression chamber, means being provided for conducting liquid about said plungers, a rotary valve carried by said rotor for controlling flow of liquid about the plungers, and actuating means for said valve including a member slidable longitudinally of the driven shaft internally of the casing, means for converting sliding movement of said member into rotary movement for adjusting said valve, and means slidable longitudinally of said shaft and operating through said casing for shifting said member longitudinally, said means being adapted to turn with the casing about the shaft and about said member.

20. A hydraulic clutch including a casing adapted to be rotated by a power unit, a rotatable driven shaft extending into said casing, a rotor fixed to said shaft in said casing, means for transmitting rotary motion from said casing to said rotor at controlled speeds including a rotary valve carried by said rotor, and adjusting means for said valve including a member shiftable longitudinally of the shaft within the casing, means for transforming longitudinal movement of said member into rotary motion for adjusting the valve, means carried by said casing for turning therewith relative to the shaft and said member and being slidable longitudinally of said shaft and connected with said member, and means for shifting the last mentioned means longitudinally of the shaft to adjust the said member longitudinally of the shaft.

FRANKLIN E. STAATS.